US009752876B2

(12) United States Patent
Ohtomo et al.

(10) Patent No.: US 9,752,876 B2
(45) Date of Patent: Sep. 5, 2017

(54) DIRECTION DETECTING APPARATUS AND SURVEYING SYSTEM

(71) Applicant: Kabushiki Kaisha TOPCON, Itabashi-ku, Tokyo-to (JP)

(72) Inventors: Fumio Ohtomo, Asaka (JP); Kaoru Kumagai, Tokyo-to (JP); Kazuki Osaragi, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 302 days.

(21) Appl. No.: 14/481,166

(22) Filed: Sep. 9, 2014

(65) Prior Publication Data

US 2015/0077545 A1 Mar. 19, 2015

(30) Foreign Application Priority Data

Sep. 17, 2013 (JP) ................................. 2013-192027

(51) Int. Cl.
*G01C 15/00* (2006.01)
*G01C 15/06* (2006.01)

(52) U.S. Cl.
CPC .......... *G01C 15/002* (2013.01); *G01C 15/00* (2013.01); *G01C 15/006* (2013.01); *G01C 15/06* (2013.01)

(58) Field of Classification Search
CPC ...... G01C 15/002; G01C 15/06; G01C 15/00; G01C 15/006
See application file for complete search history.

(56) References Cited

U.S. PATENT DOCUMENTS

| 5,822,050 A | 10/1998 | Ohtomo et al. |
| 2008/0229592 A1* | 9/2008 | Hinderling ........... G01C 15/002 33/293 |
| 2009/0144995 A1* | 6/2009 | Yahagi ................... G01C 15/00 33/293 |
| 2013/0093882 A1* | 4/2013 | Kotzur ..................... G01C 1/04 348/135 |
| 2013/0176570 A1* | 7/2013 | Beck ..................... G01N 21/314 356/433 |

FOREIGN PATENT DOCUMENTS

JP 8-304072 A 11/1996

OTHER PUBLICATIONS

European communication dated Feb. 18, 2015 in corresponding European patent application No. 14184156.9.

* cited by examiner

*Primary Examiner* — Christopher S Kelley
*Assistant Examiner* — Maria Vazquez Colon
(74) *Attorney, Agent, or Firm* — Nields, Lemack & Frame, LLC

(57) ABSTRACT

A direction detecting apparatus provided at a known position from a lower end of a supporting pole, comprising an image pickup device with an optical axis orthogonal to an axis of the supporting pole and an arithmetic processing part for calculating based on an image from the image pickup device, wherein the image pickup device acquires an image so as to include an object for which a direction is to be detected, wherein the arithmetic processing part calculates and detects a direction and a tilt of the object from a relation between a position of the object in the image and an optical axis of the image pickup device.

8 Claims, 5 Drawing Sheets

TIMING PULSE
DETECTION SIGNAL

POLARIZATION
DETECTION SIGNAL

DIRECTION DETECTING APPARATUS AND SURVEYING SYSTEM

BACKGROUND OF THE INVENTION

The present invention relates to a direction detecting apparatus which detects a direction of a light source and a surveying system provided with the direction detecting apparatus.

In recent years, there has been increased cases where a corner cube is used as an object to be measured and where a surveying instrument with a tracking function tracks the corner cube and measures a position of the corner cube.

In this case, in order to accurately measure a distance between a main body of a surveying instrument and a corner cube, it is necessary' that the corner cube is positioned vertically above a measurement point. Normally, the corner cube is provided at an upper part of a supporting pole, and an operator sets a lower end of the supporting pole at the measurement. Point and vertically supports the supporting pole. Further, a bubble tube is provided at the supporting pole so that the operator can vertically support the supporting pole and so that the operator confirms whether or not the supporting pole is vertically placed by the bubble tube.

In this case, whether or not the supporting pole is supported in a vertical state depends on a level of skill of the operator, and there is a problem that an error becomes larger in a case where a supporting pole is longer, and the like.

SUMMARY OF THE INVENTION

It is an object of the present invention to provide direction detecting apparatus which can detect a position of an object without being influenced by a level of skill of an operator and a surveying system using direction detecting apparatus.

To attain the object as described above, a direction detecting apparatus according to the present invention is provided at a known position from a lower end of a supporting pole, comprising an image pickup device with an optical axis orthogonal to an axis of the supporting pole and an arithmetic processing part for calculating based on an image from the image pickup device, wherein the image pickup device acquires an image so as to include an object for which direction to be detected, wherein the arithmetic processing part calculates and detects a direction and a tilt of the object from a relation between a position of the object in the image and an optical axis of the image pickup device.

Further, in the direction detecting apparatus according to the present invention, the object is a surveying instrument that emits a tracking light, the direction detecting apparatus comprises a retro-reflector, and the arithmetic processing part detects a direction of a light source of the tracking light emitted toward the retro-reflector.

Further, in the direction detecting apparatus according to the present invention, the tracking light is comprised of light pulses emitted at predetermined time intervals and the direction detecting apparatus has a timing pulse detecting part, wherein the timing pulse detecting part detects the tracking light and produces a timing pulse based on a detection result and the image pickup device acquires an image in synchronism with the timing pulse.

Further, in the direction detecting apparatus according to the present invention, the tracking light is a polarized light rotating around an optical axis as the center and has a reference light pulse corresponding with a reference polarization direction of the polarized light, the direction detecting apparatus has a polarization detecting unit for detecting a polarization direction of the tracking light, wherein the polarization detecting unit detects a polarization direction of the tracking light when detecting the reference light pulse and detects a tilt of the direction detecting apparatus based on the detected polarization direction.

Further, the direction detecting apparatus according to the present invention comprises a plurality of sets each including the image pickup device, the timing pulse detecting part and the polarization detecting unit, and enabling detection of a direction an object at an arbitrary position of a total circumference.

Further, in the direction detecting apparatus according to the present invention, the image pickup device acquires an image only when the light pulse is emitted.

Further, in the direction detecting apparatus according to the present invention, the reference light pulse has a larger pulse width than other light pulses.

Further, in the direction detecting apparatus according to the present invention, a light emitting duration is made longer or shorter for light pulses before and after the reference light pulse.

Further, a surveying system according to the present invention comprises a surveying instrument and a measurement point indicating device, wherein the measurement point indicating device comprises a supporting pole of which lower end indicates a measurement point, a retro-reflector provided at a known position from the lower end of the supporting pole, and a direction detecting apparatus according to claim 1 which has an optical axis parallel to the retro-reflector, wherein the direction detecting apparatus detects a direction of the surveying instrument.

Furthermore, in the surveying system according to the present invention, the surveying instrument comprises a tracking light generating unit, the tracking light generating unit projects a tracking light of a polarized light rotating around an optical axis as the center, the tracking light is comprised of light pulses emitted as predetermined intervals and a reference light pulse emitted corresponding with a reference polarization direction of the polarized light, the direction detecting apparatus comprises a timing pulse detecting part, the timing pulse detecting part detects the tracking light and produces a timing pulse based on the detecting result, the image pickup device acquires an image in synchronism with the timing pulse, wherein the direction detecting apparatus comprises a polarization detecting unit for detecting a polarization direction of the tracking light, wherein the polarization detecting unit detects the polarization direction of the tracking light when detecting the reference light pulse and detects a tilt of the measurement point indicating device based on the detected polarization direction.

According to the present invention, the direction detecting apparatus is provided at a known position from a lower end of a supporting pole, comprising an image pickup device with an optical axis orthogonal to an axis of the supporting pole and an arithmetic processing part calculating based on an image from the image pickup device, wherein the image pickup device acquires an image so as to include an object for which a direction is to be detected, wherein the arithmetic processing part calculates and detects a direction and a tilt of the object from a relation between a position of the object in the image and an optical axis of the image pickup device. As a result, it is possible to easily detect the direction of the object from die image without providing a tilt sensor or the like on the direction detecting apparatus.

Further, according to the present invention, the object is a surveying instrument that emits a tracking light, the direction detecting apparatus comprises a retro-reflector, and the arithmetic processing part detects a direction of a light source of the tracking light emitted toward the retro-reflector. As a result, a direction of the surveying instrument can be determined at the direction detecting apparatus side, so that it is possible to easily align the direction detecting apparatus to the direction of the surveying instrument.

Further, according to the present invention, the tracking light is comprised of light pulses emitted at predetermined time intervals, and the direction detecting apparatus has a timing pulse detecting part, wherein the timing pulse detecting part detects the tracking light and produces a timing pulse based on a detection result and the image pickup device acquires an image in synchronism with the timing pulse. As a result, it is not necessary to provide a timing generator or the like on the direction detecting apparatus, and it is possible to easily achieve synchronization between the tracking light and an operating of the direction detecting apparatus.

Further, according to the present invention, the tracking light is a polarized, light rotating around an optical, axis as the center and has a reference light pulse corresponding with a reference polarization direction of the polarized light, the direction detecting apparatus has a polarization detecting unit for detecting a polarization direction of the tracking light, wherein the polarization detecting unit detects a polarization direction of the tracking light when detecting the reference light pulse and detects a tilt of the direction detecting apparatus based on the detected polarization direction. As a result, the tilt of the direction detecting apparatus can be detected easily without providing a tilt sensor or the like at the direction detecting apparatus side and without the influence of a level, of skill of an operator.

Further, according to the present invention, a survey system comprises a surveying instrument and a measurement point indicating device, wherein the measurement point indicating device comprises a supporting pole of which lower end indicates a measurement point, a retro-reflector provided at a known position from the lower end of the supporting pole, and a direction detecting apparatus according to claim 1 which has an optical axis parallel to the retro-reflector, wherein the direction detecting apparatus detects a direction of the surveying instrument. As a result, the direction of the surveying instrument at the direction detecting apparatus side can be detected and workability is improved.

Furthermore, according to the present invention, the surveying instrument comprises a tracking light generating unit, the tracking light generating unit projects a tracking light of a polarized light rotating around an optical axis as the center, the tracking light is comprised of light pulses emitted at predetermined intervals and a reference light pulse emitted corresponding with a reference polarization direction of the polarized light, the direction detecting apparatus comprises a timing pulse detecting part, the timing pulse detecting part detects the tracking light and produces a timing pulse based on the detecting result, the image pickup device acquires an image in synchronism with the timing pulse, wherein the direction detecting apparatus comprises a polarization detecting unit for detecting a polarization direction of the tracking light, wherein the polarization detecting unit detects the polarization direction of the tracking light when detecting the reference light pulse and detects a tilt of the measurement point indicating device based on the detected polarization direction. As a result, it is not necessary to provide a tilt sensor at the measurement point indicating device side, and the tilt of the measurement point indicating device can be measured accurately without the influence of a level of skill of an operator.

DETAILED DESCRIPTION OF THE PREFERRED EMBODIMENT

A description will be given below on embodiments of the present invention by referring to the attached drawings.

First, a summary of the embodiment of the present invention will be described using FIG. 1.

Figure 1:
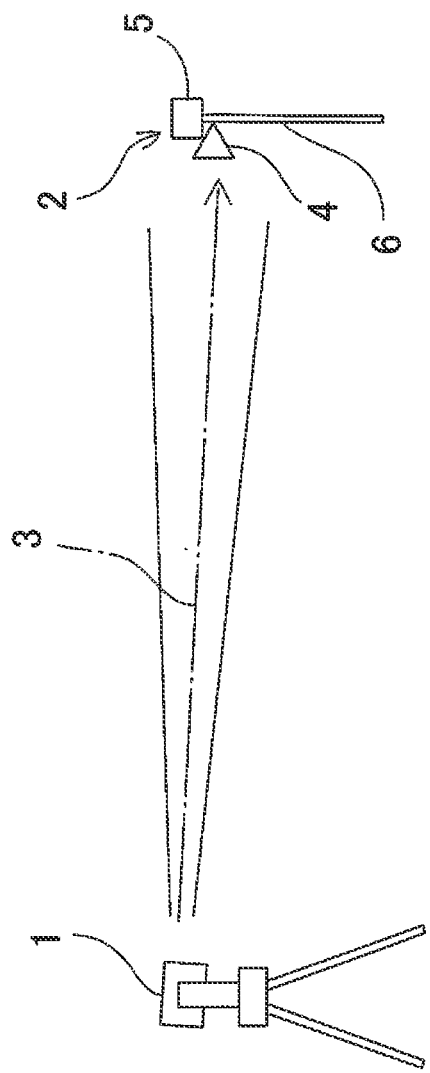
FIG. 1 is a schematical drawing of an embodiment of the present invention.

In FIG. 1, reference numeral 1 denotes a surveying instrument 1 which has a tracking function, for example, a total station and is provided at a known position. Reference numeral 2 denotes a measurement point indicating device provided with a direction detecting apparatus.

The surveying instrument 1 emits a tracking light 3, detects and tracks a reflected tracking light reflected by the measurement point indicating device 2, and further, is adapted to perform a measurement. The tracking light 3 is a pulse beam comprised of light pulses continuously emitted at predetermined time intervals. Further, the surveying instrument 1 projects a distance measurement light, detects a reflected distance measurement light reflected at the measurement point indicating device 2 and determines a distance to the measurement point indicating device 2.

The measurement point indicating device 2 comprises a retro-reflector which is an object to be measured, for example, a corner cube 4, and comprises a direction detecting apparatus 5.

The corner cube 4 is provided at a required position on a supporting pole 6 and the corner cube 4 is at a known position from a lower end of the supporting pole 6.

The direction detecting apparatus 5 is provided near the corner cube 4 and arranged so as to receive the tracking light 3 from the surveying instrument 1. Further, the direction detecting apparatus 5 is provided so as not to interfere with the corner cube 4 when receiving the tracking light 3. Further, the direction detecting apparatus 5 is located at a known position from the lower end of the supporting pole 6 and also at a known position with respect to the corner cube 4.

Figure 2:
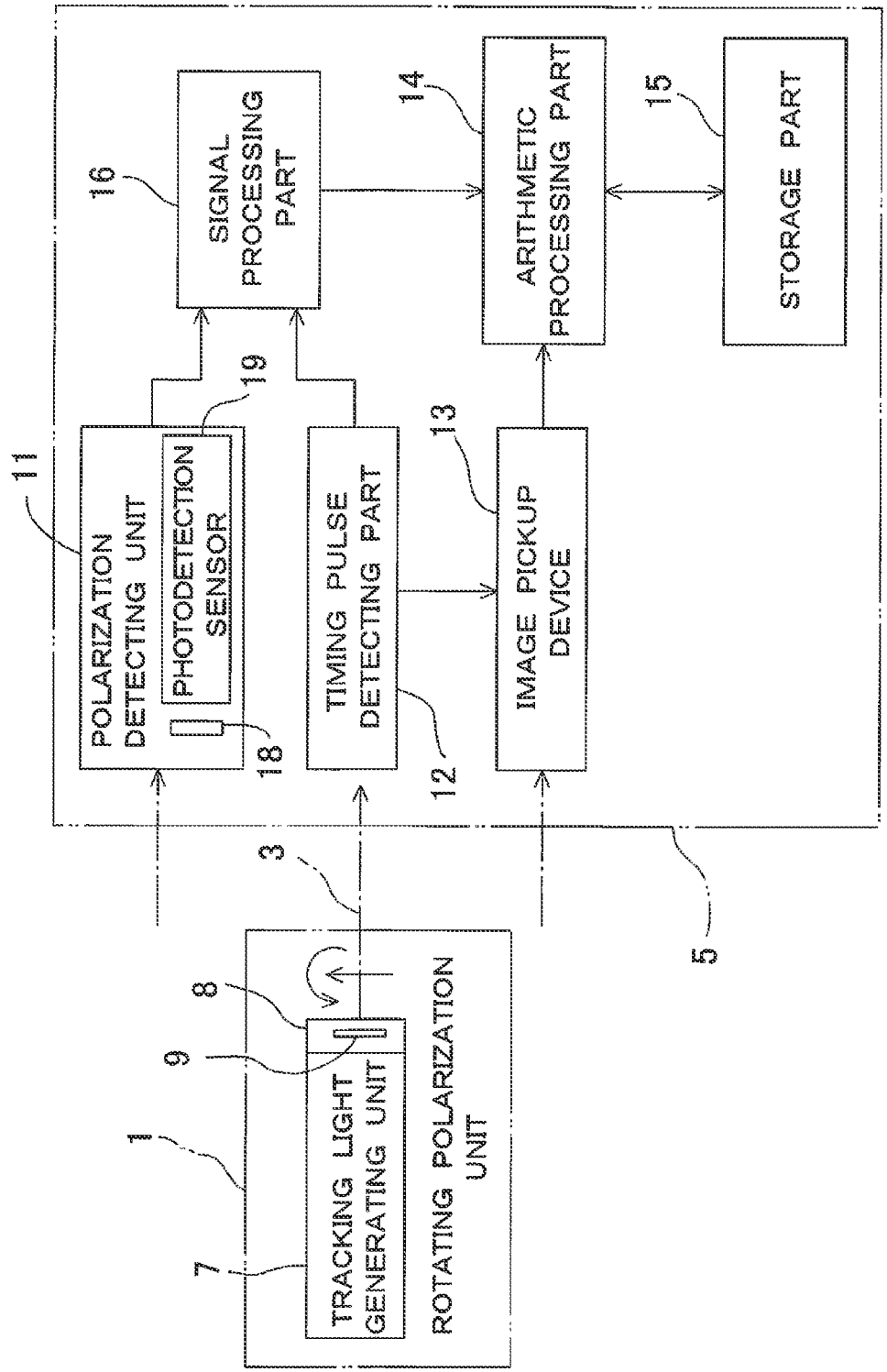
FIG. 2 is a schematic block diagram of the present embodiment.

Referring to FIG. 2, a tracking light generating unit 7 and a rotating polarization unit 8 provided at the surveying instrument 1 and the direction detecting apparatus 5 provided at the measurement point indicating device 2 will be described.

As described above, the tracking light generating unit 7 projects a pulse beam comprised of continuous light pulses as the tracking light 3. The rotating polarization unit 8 has a rotating polarization plate 9 disposed on an optical axis of the tracking light 3 and is configured to rotate the rotating polarization plate 9 at a predetermined constant speed. Accordingly, the tracking light 3 emitted from the tracking light generating unit 7 becomes a polarized pulse beam which is polarized in one direction by passing through the rotating polarization plate 9, and the polarization direction is rotated by a rotation of the rotating polarization plate 9. In the following description, the rotation of the polarization direction of the polarized pulse beam is defined as rotation of one optical axis of the tracking light 3.

The direction detecting apparatus 5 comprises a polarization detecting unit 11, a timing pulse detecting part 12, an image pickup device 13, an arithmetic processing part 14, a storage part 15 and a signal processing part 16.

The polarization detecting unit 11 has a static polarization plate 18 and comprises a photodetection sensor 19 which receives the tracking light 3 passing through the static polarization plate 18. A received signal (hereinafter, referred to as a polarization detection signal) from the photodetection sensor 19 is input to the signal processing part 16. A required signal processing such as amplification, A/D conversion, etc. is executed in the signal processing part 16, and polarization detection signal is inputted to the arithmetic processing part 14. Here, the static polarization plate 18 has a predetermined polarization direction with respect to a posture of the measurement point indicating device 2. For instance, when the polarization direction is set parallel to an axis of the supporting pole 6 and the measurement point indicating device 2 is made to stand vertically, the polarization direction of the static polarization plate 18 also becomes vertical.

The timing pulse detecting part 12 receives the tracking light 3 and produces a timing signal based on the light pulses of the tracking light 3. The timing signal is input to the image pickup device 13 and also input to the arithmetic processing part 14 via the signal processing part 16.

The image pickup device 13 has an optical axis orthogonal to the supporting pole 6 and the optical axis of the image pickup device 13 is set so that the optical axis of the image pickup device 13 becomes horizontal when the supporting pole 6 is erected vertically. Further, the optical axis of the image pickup device 13 is directed in a direction where an object, of which a direction is to be detected, exists and acquires an image of she object. In the present embodiment, the object is the surveying instrument 1, the image pickup device 13 acquires an image of the surveying instrument and outputs to the arithmetic processing part 14 as a digital image signal.

The storage part 15 stores an image signal acquired at the image pickup device 13 and the storage part 15 stores a polarization detection signal from the polarization detecting unit 11 as processed at the signal processing part 16.

Further, the storage part 15 stores an image processing program for processing an image signal and an angle detection program for calculating a tilt angle of the measurement point indicating device 2 based on signal from the polarization detecting unit 11, and the like.

Description will be given below on an operation for detecting a light source direction by referring to FIG. 1 and FIG. 3.

Figure 3:
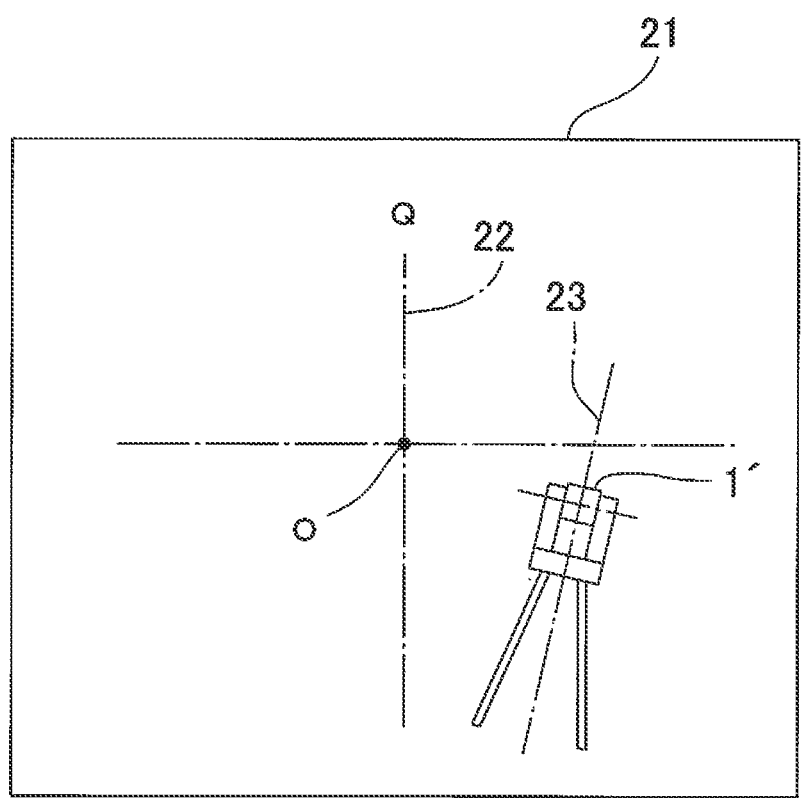
FIG. 3 is a diagram to show one example of an image acquired by an image pickup device.

FIG. 3 shows an image 21 acquired by the image pickup device 13.

In the image 21, one-dot chain lines 22 which intersect with each other indicate a coordinate system Q of the image 21 and an intersection point (an origin point O of the coordinate) of the one-dot chain lines 22 coincides with an optical axis of the image pickup device 13. Further, reference numeral 1' in the image 21 denotes a surveying instrument image of the surveying instrument 1. Further, in the image 21, an intersection point of one-dot chain lines 23 indicates an optical axis of the surveying instrument 1. It is to be noted that the coordinate system Q substantially means a polar coordinate system around the origin point O as the center in a relation with an angle of view.

When the optical axis of the image pickup device 13 coincides with the optical axis of the surveying instrument 1, the intersection point of the one-dot chain lines 22 coincides with the intersection point, of the one-dot chain lines 23 on the image 21.

If the measurement point indicating device 2 is tilted (tilted backwards) so as to move away from the surveying instrument 1, the surveying instrument image 1' in the polarization detecting unit 11 appears below the image 21. Further, if the measurement point indicating device 2 faces a leftward direction with respect to the surveying instrument 1, the surveying instrument image 1 appears on the right side of the image 21. That is to say, a direction angle of the measurement point indicating device 2 can be known from the position of the surveying instrument image 1' (the position of the optical axis of the surveying instrument 1) which appears on the coordinate system Q.

Accordingly, under the condition of FIG. 3, illustrates the measurement point indicating device 2 is tilted backward and faces the leftward direction. Further, it is possible to obtain a direction angle of the intersection point of the one-dot chain lines 23 from an amount of deviation between the intersection point of the one-dot chain lines 22 and the intersection point of the one-dot chain lines 23 in the polar coordinate system Q.

Next, descriptions will be given on a case where a tilt of the measurement point, indicating device 2 is obtained.

When the rotating polarization plate 9 is rotated under a state where the tracking light 3 is projected, the tracking light 3 is polarized in one direction and further the tracking light 3, of which optical axis rotates, is projected.

When tracking light 3 is received by the photodetection sensor 19 via the static polarization plate 18, the polarization detection signal, of which a light amount changes in a sine curve manner, can be obtained. Further, two cycles of a sine curve can be obtained by one rotation of the rotating polarization plate 9.

Figures 4A, 4B:
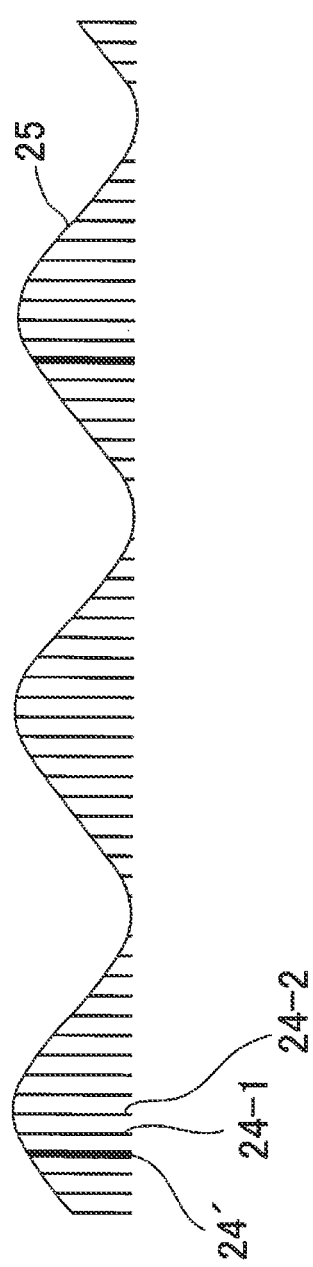
FIG. 4A illustrates a timing pulse generated based on a tracking light and FIG. 4B is a diagram to show a relation between a detected light amount detected at a measurement point indicating device and the timing pulse.

As described above, the tracking light 3 is comprised of light pulses emitted at predetermined time intervals. The timing pulse detecting part 12 receives the tracking light 3 and generates a timing signal based on the light pulses. FIG. 4A illustrates a timing signal 24 output from the timing pulse detecting part 12.

From the fact that the rotating polarization plate 9 rotates at a constant speed and the light pulses of the tracking light 3 are emitted at specific time (constant time) intervals, the time intervals of the light pulses correspond to a rotation angle of the rotating polarization plate 9, and each light pulse indicates a rotational position of the rotating polarization plate 9. Further, a light pulse (hereinafter, referred to as reference light pulse) emitted at a reference position (a reference rotational position) of the rotating polarization plate 9, among the light pulses, is changed so as to be distinguishable from other light pulses. For instance, a pulse width of the reference light pulse is made wider than pulse widths of other light pulses. Or, a light emitting duration is made shorter, or longer, for light pulses before and after the reference light pulse.

The reference position of the rotating polarization plate 9 can be set to an arbitrary angle with respect to a vertical (or a horizontal) direction. For instance, the reference position of the rotating polarization plate is set so that the polarization direction of the rotating polarization plate 9 is vertical, that is, a phase is 0°. In this case, when the light amount of the tracking light 3 as detected by the measurement point indicating device 2 becomes maximum, it means that the measurement point indicating device 2 is supported in a vertical state.

FIG. 4A and FIG. 4B illustrates the tracking light 3 in which the pulse width of the reference light pulse is made wider than the pulse widths of other light pulses. In FIG. 4A, a timing signal which is indicated with a thick line is a reference timing signal 24 detected based on a light pulse emitted at the reference position.

FIG. 4B shows a relation between the timing signal 24 and the detected light amount of the tracking light 3, and the light amount of the light pulses as received by the photodetection sensor 19 changes with the rotation of the rotating polarization plate 9. Accordingly, the light amount of a polarization detection signal output from the photodetection sensor 19 becomes maximum when the polarization direction of the rotating polarization plate 9 is the same as the static polarization plate 18 (the phases are the same), and the light amount becomes minimum in a state where the phase of the rotating polarization plate 9 differs from the phase of the static polarization plate 18 by 90°. Two cycles of a sine curve 25 appear in an envelope of a change of light amount with respect to rotation of the rotating polarization plate 9, and a light pulse as emitted at the reference position (indicated with a thick line in FIG. 4B) appears once per two cycles.

In the polarization detection signal shown in FIG. 4B, a signal value (a light amount) of the second signal with respect to the reference timing signal 24 is maximum. Accordingly, in can be confirmed that the phase of the static polarization plate 18 coincided with the phase of the rotating polarization plate 9 at the time of the second timing signal 24 and means that the phase of the static polarization plate 18 is deviated by an amount corresponding to two of the timing signals 24 with respect to the rotating polarization plate 9. By obtaining this phase difference, a tilt of the measurement point indicating device 2 can be obtained. Further, since there are two cycles of sine curves, it is not possible to know which of the two cycles. In this case, it becomes possible to judge by providing a simple acceleration sensor.

Figure 5:
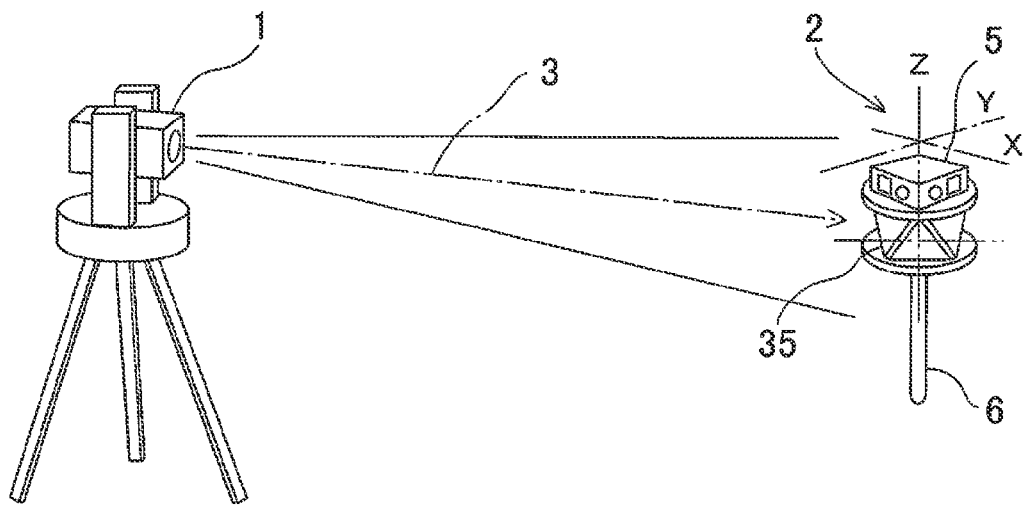
FIG. 5 is a schematical drawing to show an application example in a case where the measurement point indicating device is changed, in the present embodiment.

FIG. 5 shows a modified example of the measurement point indicating device 2.

A retro-reflector used in the measurement point indicating device 2 is an omnidirectional prism 35 structured so as to retro-reflect a light entering from an arbitrary direction of total circumference.

Further, the direction detecting apparatus 5 is provided on an upper surface of the omnidirectional prism 35 and has four sets of the polarization detecting unit 11, the timing pulse detecting part 12 and the image pickup unit 13 (see FIG. 2).

The direction detecting apparatus 5 has four surfaces orthogonal to one another, and the polarization detecting unit 11, the timing pulse detecting part 12 and the image pickup unit 13 are provided on each surface respectively. The direction detecting apparatus 5 structured so as to detect a tracking light 3 from an arbitrary direction of total circumferential direction and pick up an image.

Further, the direction detecting apparatus 5 is configured so that at the beginning of measurement, all of the timing pulse detecting parts 12 detect the tracking light 3, and after the tracking light 3 is detected, the timing pulse detecting part 12 which detects the tracking light 3 and the polarization detecting unit 11 and the imaging unit 13 which are integrated with the timing pulse detecting part 12 operate.

Further, in a case where the image pickup device 13 picks up an image of the surveying instrument 1, since the tracking light 3 is a beam of continuous light pulses, an image capturing of the image pickup device 13 is controlled so that an image is picked up only when light pulses are emitted. For instance, a shutter of the image pickup device 13 is opened slightly longer than a light emitting duration of the light pulse, or the shutter is opened by synchronizing with a timing signal based on the timing signal obtained from the light pulses, or the like. By capturing an image of the surveying instrument 1 only when the light pulses are emitted, it is possible to reduce an amount of a light entering from the surrounding (a background light), so that it is possible to increase a ratio of the light pulses with respect to the background light (S/N) and improve a measurement accuracy.

Figure 6:
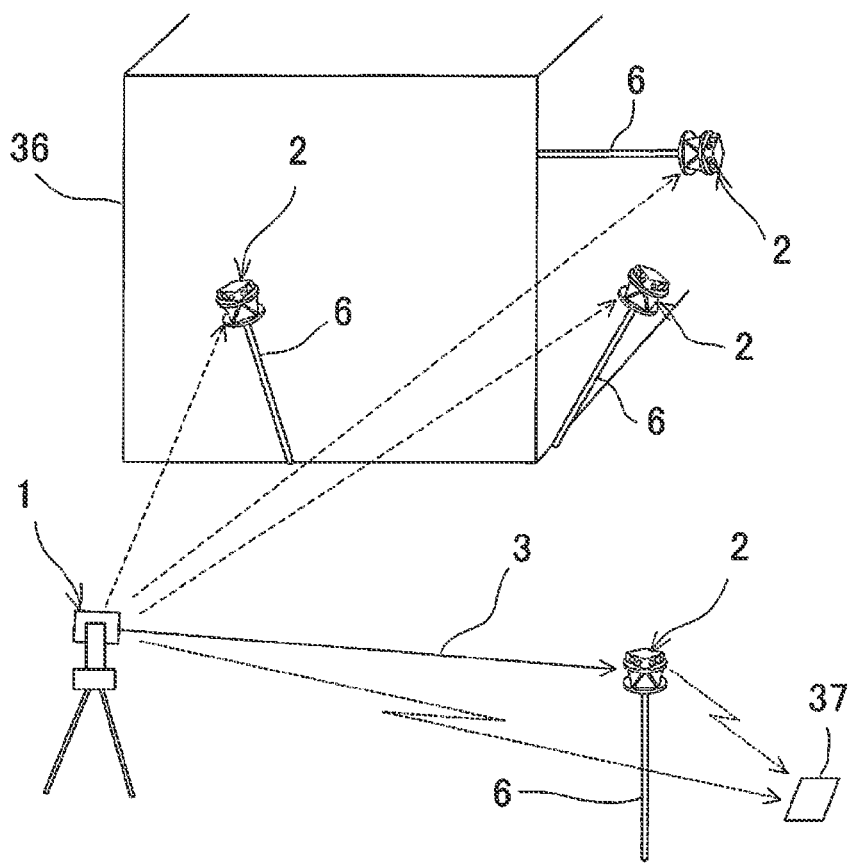
FIG. 6 is an explanatory drawing to show an example of a surveying method using the present embodiment.

FIG. 6 shows an application example of an embodiment of the present invention.

As described above, in the present embodiment, since it is not necessary for the measurement point indicating device 2 to be vertical to measure a measurement point, the measurement point indicating device 2 can accurately measure the measurement point at any posture. Accordingly, it is possible to measure various positions such as a corner, a side surface and a ceiling, etc. of a structure 36.

Further, a communication device is provided with the measurement point indicating device 2 and a data collecting device 37 which can communicate with the surveying instrument and the measurement point indicating device 2 are prepared. So, data obtained by the surveying instrument 1 and by the measurement point indicating device 2 may be collected by the data collecting device 37.

The invention claimed is:

1. A direction detecting apparatus provided at a known position from a lower end of a supporting pole, comprising an image pickup device with an optical axis orthogonal to an axis of said supporting pole, an arithmetic processing part, a retro-reflector and a polarization detecting unit, wherein said image pickup device acquires an image so as to include a surveying instrument that emits a tracking light for which a direction is to be detected, wherein said tracking light is a polarized light rotating around an optical axis as the center and has a reference light pulse corresponding with a reference polarization direction of said polarized light, wherein said arithmetic processing part calculates a direction angle of said surveying instrument from a relation between a position of said surveying instrument in said image and an optical axis of said image pickup device and detects a direction of a light source of said tracking light emitted toward said retro-reflector, wherein said polarization detecting unit detects a polarization direction of said tracking light when detecting said reference light pulse and detects a tilt of said direction detecting apparatus based on the detected polarization direction.

2. The direction detecting apparatus according to claim 1, wherein said tracking light is comprised of light pulses emitted at predetermined time intervals and said direction detecting apparatus has a timing pulse detecting part, wherein said timing pulse detecting part detects said tracking light and produces a timing pulse based on a detection result and said image pickup device acquires an image in synchronism with said timing pulse.

3. The direction detecting apparatus according to claim 1, comprising a plurality of sets each including said image pickup device, said timing pulse detecting part and said polarization detecting unit, and enabling detection of a direction of an object at an arbitrary position of a total circumference.

4. The direction detecting apparatus according to claim 2, wherein said image pickup device acquires an image only when said light pulse is emitted.

5. The direction detecting apparatus according to claim 1, wherein said reference light pulse has a larger pulse width than other light pulses.

6. The direction detecting apparatus according to claim 1, wherein a light emitting duration is made longer or shorter for light pulses before and after said reference light pulse.

7. A surveying system comprising a surveying instrument that emits a tracking light and a measurement point indicating device, wherein said measurement point indicating device comprising a supporting pole of which lower end indicates a measurement point, a retro-reflector provided at a known position from said lower end of said supporting pole, and a direction detecting apparatus provided at a known distance from said lower end of said supporting pole wherein said direction detecting apparatus comprises an image pickup device with an optical axis orthogonal to an axis of said supporting pole and parallel to said retro-reflector, an arithmetic processing part and a polarization detecting unit for detecting a polarization direction of said tracking light, wherein said image pickup device acquires an image so as to include said surveying instrument for which a direction is to be detected, wherein said tracking light is a polarized light rotating around an optical axis as the center and arranged so as to have a reference light pulse corresponding with a reference polarization direction of said polarized light, wherein said arithmetic processing part calculates a direction angle of said surveying instrument from a relation between a position of said surveying instrument in said image and an optical axis of said image pickup device and detects a direction of a light source of said tracking light emitted toward said retro-reflector, wherein said polarization detecting unit is arranged so as to detect a polarization direction of said tracking light when detecting said reference light pulse and detects a tilt of said direction detecting apparatus based on the detected polarization direction.

8. The surveying system according to claim 7, wherein said surveying instrument comprises a tracking light generating unit, said tracking light generating unit projects a tracking light of a polarized light rotating around an optical axis as the center, said tracking light is comprised of light pulses emitted at predetermined intervals and a reference light pulse emitted corresponding with a reference polarization direction of said polarized light, said direction detecting apparatus comprises a timing pulse detecting part, said timing pulse detecting part detects said tracking light and produces a timing pulse based on the detecting result, said image pickup device acquires an image in synchronism with said timing pulse, wherein said direction detecting apparatus comprises a polarization detecting unit for detecting a polarization direction of said tracking light, wherein said polarization detecting unit detects the polarization direction of said tracking light when detecting said reference light pulse and detects a tilt of said measurement point indicating device based on the detected polarization direction.

* * * * *